United States Patent [19]

Wilson

[11] 3,891,257
[45] June 24, 1975

[54] ADJUSTABLE WOVEN ROPE ASSEMBLY

[76] Inventor: William P. Wilson, 2820 W. Fuller, Ft. Worth, Tex. 76133

[22] Filed: Sept. 21, 1973

[21] Appl. No.: 399,616

[52] U.S. Cl. ................ 292/262; 248/361 B; 24/129
[51] Int. Cl. ............................................. E05c 17/04
[58] Field of Search .......... 292/262; 24/129, 73 HH, 24/265 AL; 248/361 B

[56] References Cited
UNITED STATES PATENTS

| | | | |
|---|---|---|---|
| 571,420 | 9/1910 | Tannert | 24/129 R |
| 627,215 | 6/1899 | Stewart | 24/129 R |
| 698,560 | 4/1902 | Rugg | 24/129 R |
| 3,474,507 | 10/1969 | Thompson | 24/265 AL |
| 3,718,947 | 3/1973 | Huber | 248/361 A X |

Primary Examiner—Roy D. Frazier
Assistant Examiner—Peter A. Aschenbrenner
Attorney, Agent, or Firm—Clarence A. O'Brien; Harvey B. Jacobson

[57] ABSTRACT

A flexible, adjustable, elongated braided rope assembly includes a free end and at least two sleeves integral with the rope assembly spaced from the free end. The free end is bent upon itself to form a loop with the free end extending longitudinally through and projecting beyond the sleeves. A tubular handle is threaded onto the rope assembly between the sleeves.

6 Claims, 4 Drawing Figures

PATENTED JUN 24 1975            3,891,257
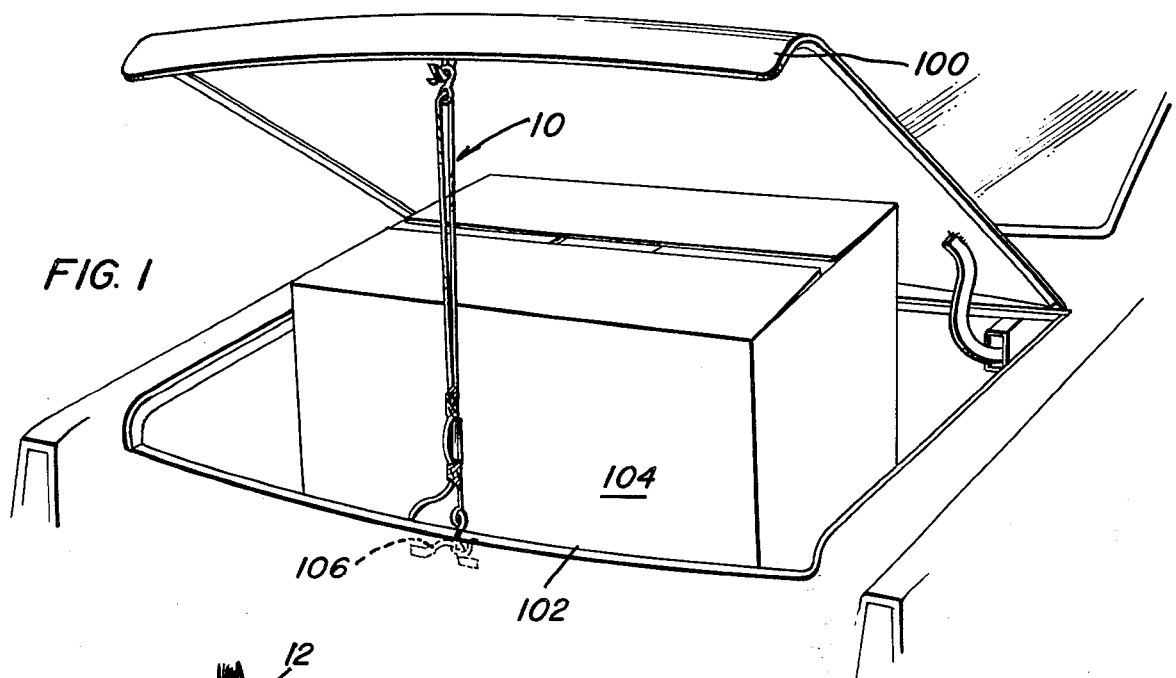
FIG. 1
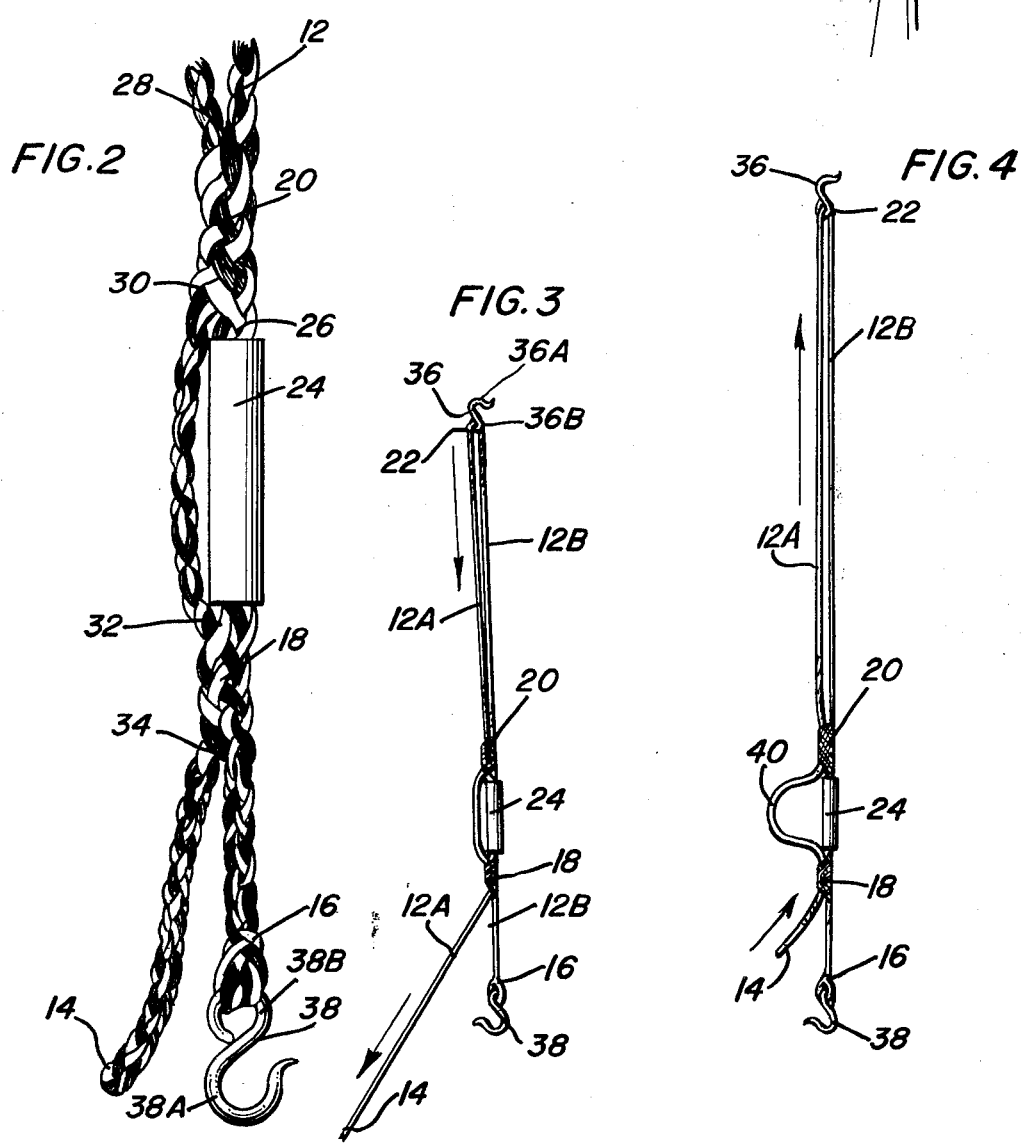
FIG. 2
FIG. 3
FIG. 4

ADJUSTABLE WOVEN ROPE ASSEMBLY

The present invention relates to adjustable length connectors, and, more particularly, to an adjustable length braided rope assembly suitable for example, for holding automobile trunk lids in a partially closed position.

Flexible, adjustable length connectors including means at the ends thereof for interengagement with the trunk lid and the lower portion of the rear car body are well known. However, the connectors are unnecessarily complicated or difficult to use and require special clamps, springs, buckles and the like.

Accordingly, it is an object of the present invention to provide an adjustable length connector which is of simple construction and easy to store and use.

It is another object of the invention to provide an adjustable length connector in the form of a braided rope assembly having integral braided sleeves.

It is still another object of the invention to provide a braided rope, adjustable length, connector which can be readily tightened and, irrespective of the tension on the rope, readily released by providing a tubular handle on the rope assembly between the sleeves.

Other objects and advantages will become apparent from the following description and appended claims taken in conjunction with the accompanying drawings.

FIG. 1 is a perspective view of the rear end of a partially closed vehicle trunk with the adjustable length connector of the present invention fastened in place between the trunk lid and a portion of the lower rear car body.

FIG. 2 is a perspective view of a portion of the adjustable length connector of the present invention showing the integral sleeves, the tubular handle and the hook means for engaging the car trunk lid and body.

FIG. 3 illustrates the manner in which the adjustable length braided rope assembly of the present invention may be shortened and tensioned.

FIG. 4 illustrates the manner in which the adjustable length braided rope assembly of the present invention may be lengthened and the tension released.

Referring first to FIG. 1 there is shown the adjustable length connector of the present invention, designated as 10, in place between a vehicle trunk lid 100 and a portion 102 of the lower, rear body of the vehicle to hold the lid 100 partially closed over container 104. As is well known, when oversized containers are carried in the trunks of vehicles, a resilient connector is necessary to partially close and thereby secure the trunk lid. At the same time, by partially closing the trunk lid, visibility through the rear window of the vehicle is greatly improved.

Connector 10 comprises a braided rope length 12 having two ends 14 and 16. One end, 14, designated as the free end, is adapted to pass through a plurality of braided sleeves, designated 18 and 20, integral with length 12 to form a loop 22 having length sections 12A and 12B on either side of the loop. As can be seen in the drawings, section 12A extends between loop 22 and free end 14. Section 12B extends between loop 22 and end 16, designated the fixed end. The sleeves function as means for gripping and retaining the portion of length 12 passing therethrough, as will be more fully explained hereinafter. Sleeves 18 and 20 are spaced apart along the length 12 of connector 10 and preferably are disposed adjacent, but spaced from, fixed end 16. An elongated cylindrical tube 24, preferably of plastic construction, is threaded upon length 12 and disposed along the portion 26 of length 12 intermediate sleeves 18 and 20. Handle 24 is constrained against substantial lengthwise movement by virtue of length section 12A intersecting section 12B at sleeves 18 and 20.

Connector 10 is an improvement over the guy rope disclosed in U.S. Pat. No. 1,892,611. The latter guy rope, which employs only one integral sleeve along its length, suffers from the disadvantage that when highly tensioned it is extremely difficult, if not impossible, to release the tension in the rope. This is because the substantially parallel length sections on either side of the loop are drawn into very close proximity along their entire lengths as tension in the guy rope is increased. Thus, it is a very difficult matter to grasp the tensioned length section and to pull it perpendicularly away from the non-tensioned length section to loosen the guy rope. To remedy this difficulty, the present invention provides two integral sleeves 18 and 20 formed in length section 12B and a rigid tubular handle 24 threaded onto section 12B intermediate the sleeves.

FIG. 2 clearly shows the tubular braided construction of the rope wherein three or more component strands are interwoven to form a regular diagonal pattern along length 12. The sleeves, which can be of any length, are formed between spaced apart pairs of braided cross strands. For example, sleeve 20 is formed by inserting the free end 14 of length section 12A into the tubular hollow of the rope braid between one pair of cross strands 28 and removing end 14 from the tubular hollow between another pair of cross strands 30 longitudinally spaced apart from the first pair of cross strands 28. In like manner, sleeve 18 is formed by inserting the free end 14 into the tubular hollow between a pair of cross strands 32 and removing the end 14 from the hollow between longitudinally spaced cross strands 34. In forming a sleeve, end 14 need not exit the tubular hollow at the same point on the tubular circumference as it entered, i.e. it can pass out of the hollow between cross strands at some other point on the tubular circumference as long as the exit cross strands are longitudinally spaced from the entrance cross strands. Preferably, however, the free end 14 enters and exits through cross strands at the same circumferential location to avoid tangling the rope and to assure smooth tensioning and releasing.

To use the flexible, adjustable length connector 10, such as to hold a trunk lid in the partially closed position, it is preferred to utilize a pair of hook members 36 and 38, each of generally S-shape and each having one loop 36A and 38A of the S open and the other loop 36B and 38B closed. Closed loop 36B is loosely threaded onto length 12 at loop 22. Closed loop 38B is braided or otherwise attached to fixed end 16. The open loops 36A and 38A function as hooks and are intended to grasp, respectively, the trunk lid 100 and an opening or protrusion 106 adjacent the lock mechanism of the trunk. It will be appreciated, however, that the precise points of attachment on the vehicle are immaterial as long as the hooks securely grasp the lid and lower, rear car body at or below the trunk opening.

With hooks 36 and 38 in place, connector 10 can be tensioned, i.e. the distance between the hooks can be shortened, to hold the trunk lid partially closed by grasping free end 14 and pulling it through the sleeves 18, 20 in the direction indicated in FIG. 3. When the desired tautness is achieved, the end 14 is released and the sleeves automatically grip and securely retain length section 12A against further movement. The sleeves are able to function in this manner because the tubular braided rope elongates and stretches longitudinally when tensioned causing a reduction in its cross-sectional area, i.e. it transversely contracts while it longitudinally stretches, with a consequent gripping of section 12A passing therethrough. Tension and stretching also cause the component cross strands of the braid to tightly grip the portion of the length section passing between the strands. Inasmuch as the connector of the present invention includes at least two sleeves, length section 12A is securely gripped in at least two separate locations.

To loosen connector 10, i.e. to relieve the tension therein and thereby to loosen the grip of sleeves 18 and 20, it is only necessary to relieve the tension in section 12B and then to pull length 12A through the sleeves in the direction indicated by the arrows in FIG. 4. However, relieving the tension in section 12B is an extremely difficult task where there is only one sleeve and where the load causing the tension is large, it being practically impossible to pull the tensioned length section 12B perpendicularly away from the non-tensioned length section 12A by grasping the tensioned length section with the fingers. However, in accordance with the present invention, tubular handle 24 can be readily grasped and pulled in a direction perpendicular to the tensioned length section 12B, after which the non-tensioned length section 12A may be pulled through the sleeves in the direction shown in FIG. 4. Moreover, as also shown in FIG. 4, the amount that the connector is loosened at any one time may be readily controlled according to the present invention by first drawing a predetermined length of section 12A through sleeve 18 to form a loop 40 between the sleeves, and then drawing the loop 40 through sleeve 18. In single sleeve connectors, such as the connector of U.S. Pat. No. 1,892,611, it is difficult to control the amount that the non-tensioned length is loosened.

While the present invention has been described with reference to particular embodiments thereof, it will be understood that numerous modifications can be made by those skilled in the art without actually departing from the scope of the invention. In particular, the adjustable length connector of the present invention may find utility in numerous other applications where adjustable length connectors are necessary. Accordingly, all modifications and equivalents may be resorted to which fall within the scope of the invention as claimed.

What is claimed as new is as follows:

1. An adjustable connector assembly comprising a flexible elongated rope of tubular braided construction having a free end, said free end adapted to be bent upon itself to form a loop intermediate the ends of said rope, said free end sequentially entering into and exiting from the interior of said tubular braided rope at spaced apart points along the length of said rope to define between each point of entrance and exit a lengthwise extending tubular sleeve comprised of the braids of the rope, said rope including at least two such sleeves spaced apart along its length spaced from said free end and an elongated tubular handle slidably threaded onto said rope between said sleeves.

2. A rope assembly, as claimed in claim 1, wherein said braided rope comprises interwoven component strands and each said sleeve is defined between longitudinally spaced apart pairs of crossed strands.

3. A connector assembly, as claimed in claim 1, wherein said rope includes two spaced-apart sleeves along its length.

4. An adjustable connector assembly, as claimed in claim 3, further including interengagement means on said rope at the end thereof remote from said free end and at said loop.

5. A rope assembly, as claimed in claim 4, wherein said interengagement means comprise hooks.

6. A rope assembly, as claimed in claim 5, wherein said hooks are S-shaped, one eye of said S being substantially open and the other substantially closed.

* * * * *